United States Patent
Bang (10) Patent No.: US 7,689,802 B2
(45) Date of Patent: Mar. 30, 2010

(54) CONTROLLING MEMORY ACCESS IN A MULTI-BOOTING SYSTEM

(75) Inventor: You Seok Bang, Gyeongi-do (KR)

(73) Assignee: LG Electronics Inc., Seoul (KR)

( * ) Notice: Subject to any disclaimer, the term of this patent is extended or adjusted under 35 U.S.C. 154(b) by 575 days.

(21) Appl. No.: 11/622,728

(22) Filed: Jan. 12, 2007

(65) Prior Publication Data

US 2008/0005527 A1  Jan. 3, 2008

(30) Foreign Application Priority Data

Jul. 3, 2006  (KR) .................... 10-2006-0061799

(51) Int. Cl.
   G06F 12/00  (2006.01)
(52) U.S. Cl. ................. 711/202; 711/E12.058
(58) Field of Classification Search ........... None
   See application file for complete search history.

(56) References Cited

U.S. PATENT DOCUMENTS 5,136,711 A * 8/1992 Hugard et al. ............ 713/2

6,658,563 B1  12/2003 Ice, Jr. et al.
2005/0015581 A1  1/2005 Chen
2006/0064571 A1  3/2006 Tseng

FOREIGN PATENT DOCUMENTS

EP    1 022 655    7/2000
WO   WO 92/07319   4/1992

OTHER PUBLICATIONS

International Search Report for Application No. 07101478.1 dated Apr. 1, 2009, (3 pages).

* cited by examiner

Primary Examiner—Reginald G Bragdon
Assistant Examiner—Aracelis Ruiz
(74) Attorney, Agent, or Firm—Fish & Richardson P.C.

(57) ABSTRACT

Address remapping is performed in a multi-booting system by storing a default operating system ("OS") and a non-default OS at first and second address regions of a memory medium, respectively, and receiving a selection indicative of the non-default OS. A request to access data at an intended address within the first address region is received, and a remapped address within the second address region is calculated based upon the selection. The request to access data at the intended address is changed to a request to access data at the remapped address within the second address region using a remapping application.

20 Claims, 10 Drawing Sheets

CONTROLLING MEMORY ACCESS IN A MULTI-BOOTING SYSTEM

CROSS-REFERENCE TO RELATED APPLICATION

This application claims priority to Korean Patent Application No. 10-2006-0061799, filed on Jul. 3, 2006, which is incorporated herein by reference.

BACKGROUND

1. Field

The present disclosure relates to the booting of a computer system, and one particular implementation relates to controlling access to memory in a multi-booting system.

2. Description of the Related Art

When a computer is powered on, a sequence of operations, referred to as a booting sequence, is performed to load an operating system. In a multi-booting system, more than one operating system is stored on the computer, and a user selects the appropriate operating system to load during the booting sequence.

SUMMARY

According to one general implementation, address remapping is performed in a multi-booting system by respectively storing a default operating system ("OS") and a non-default OS at first and second address regions of a memory medium, and receiving a selection indicative of the non-default OS. A request is received to access data at an intended address within the first address region, and a remapped address within the second address region is calculated based upon the selection. Using a remapping application, the request to access data at the intended address is changed to a request to access data at the remapped address within the second address region.

Implementations may include one or more of the following features. For example, a request may be received to access data at the remapped address. The request may be changed to a request to access data at the intended address using the remapping application. Access to the data may be provided at the intended address or at the remapped address. The remapped address may be calculated based on the intended address and an offset between a starting address of the first address region and a starting address of the second address region. The remapping application may be a filter driver. The non-default OS may be booted based upon the selection, which may be received during the booting process, and which may be a control or menu selection or a keypad depression. An alternate OS may be stored at a third address region of the memory medium, and the non-default OS may be booted using a basic input/output system ("BIOS"). The selection may be a user selection or an automatic selection.

According to another general implementation, a computer application product for performing address remapping in a multi-booting system is tangibly embodied in a computer-readable medium. The computer application product is operable to cause a data processing apparatus to perform operations including storing a default OS and a non-default OS at first and second address regions of a memory medium, respectively, receiving a request to access data at an intended address within the first address region, and receiving a selection indicative of the non-default OS. The computer application product is also operable to cause the data processing apparatus to perform operations including calculating a remapped address within the second address region based upon the selection, and changing the request to access data at the intended address to a request to access data at the remapped address within the second address region using a remapping application.

The details of one or more implementations are set forth in the accompanying drawings and the description below. Other features will be apparent from the description and drawings, and from the claims.

BRIEF DESCRIPTION OF THE DRAWINGS

Like reference numbers represent corresponding parts throughout.

DETAILED DESCRIPTION

Figure 1:
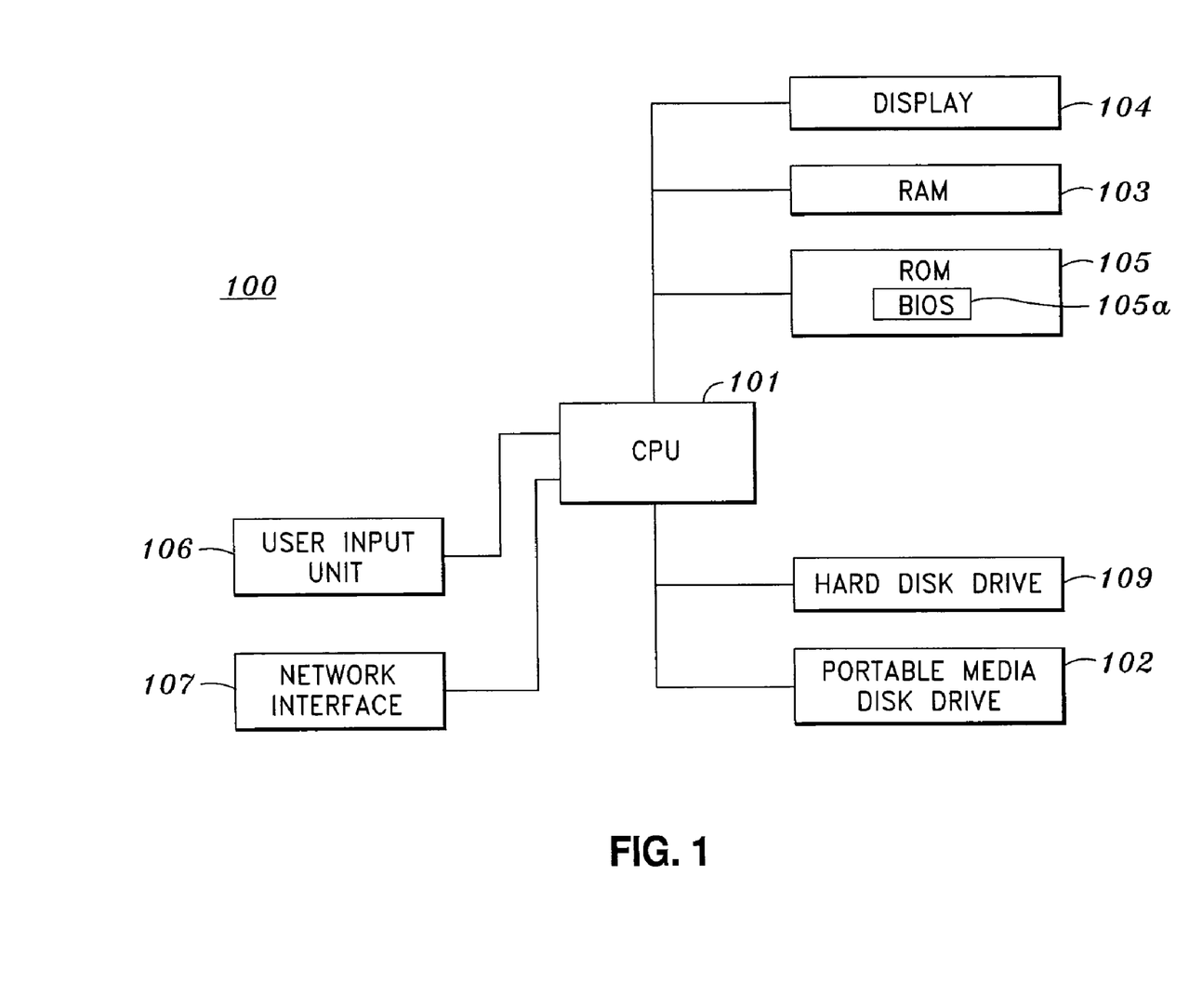
FIG. 1 is a block diagram of the internal architecture of an exemplary computer system.

FIG. 1 is a block diagram of the internal architecture of an exemplary computer system 100, that includes a central processing unit ("CPU") 101 interfacing to a portable media disk drive 102, such as a floppy disk drive or an optical disk drive. The CPU 101 also interfaces with a random-access memory ("RAM") 103, a display 104, and a read-only memory ("ROM") 105 that stores a BIOS 105a. In addition, the CPU 101 interfaces with a user input unit 106, such as a keyboard or a mouse, a network interface 107, and a hard disk drive ("HDD") 109.

When the computer system 100 is powered on, a booting sequence is performed. In one example, the booting sequence begins with the CPU 101 executing a boot loading application or firmware, such as the BIOS 105a, from the ROM 105. The primary function of the BIOS 105a is to prepare the computer system 100 so that software applications stored on various media devices, such as the HDD 109 or the portable media disk drive 102, can load, execute, and assume control of the computer system 100.

When invoked, the boot loading program or BIOS 105a searches through a preconfigured list of storage devices until it finds a bootable storage device storing at least one operating system. If the bootable storage device is divided into distinct logical sections, referred to as partitions or address regions, each partition may store a different operating system. For example, a HDD with multiple partitions may store several operating systems in different partitions of the HDD, with each partition having its own boot sector.

If the boot loading program or BIOS 105a finds a bootable storage device, the first boot sector of the bootable storage device is loaded and executed. In the case of a HDD, the first boot sector is referred to as the master boot record ("MBR"). Based on the MBR, the boot loading program or BIOS 105a loads data stored in the boot sector of a partition where an operating system is stored, and executes the data.

The boot sectors of individual partitions are called volume boot sectors, or volume boot records ("VBRs"). The loaded VBR includes the code that loads and executes the kernel of the operating system stored at the partition of the VBR. Regardless of the specific operating system being loaded, the BIOS 105a loads each operating system in the same manner, in an operating system-independent mode. In particular, the BIOS 105a merely needs to know the address of the VBR of the bootable partition to load an operating system. For example, upon accessing the stored address of the VBR, the BIOS 105a loads operating systems similarly, regardless of whether the operating system is the MICROSOFT® Disk Operating System (MS-DOS®), MICROSOFT WINDOWS® operating system, the LINUX® operating system, or another operating system.

Figure 2:
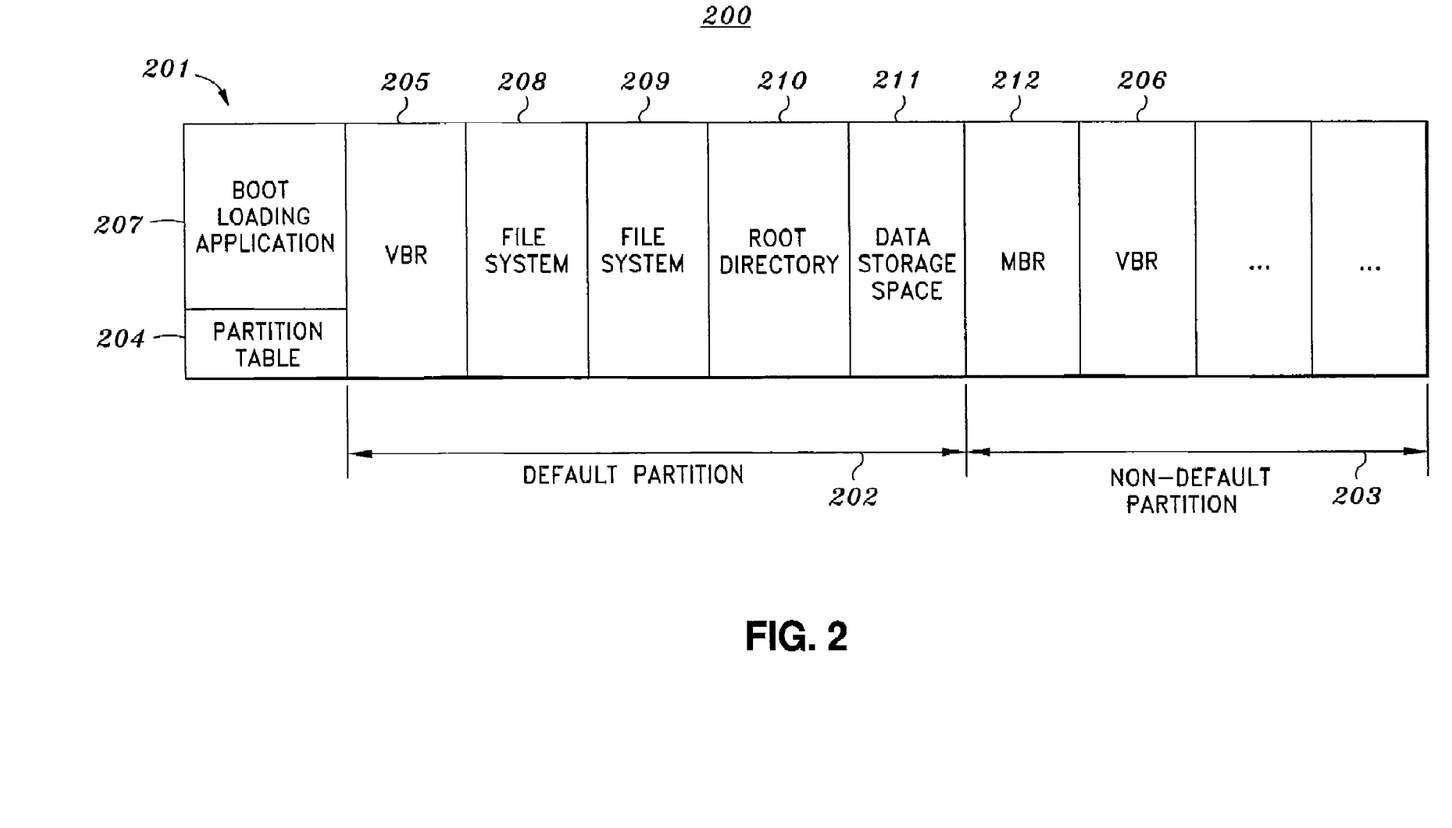
FIG. 2 depicts an exemplary storage medium that has been partitioned to include multiple operating systems.

FIG. 2 depicts an exemplary storage medium 200 that has been partitioned into a default partition 202 and a non-default partition 203, each of which store an operating system. For example, the default partition 202 may store a MICROSOFT WINDOWS® operating system, and the non-default partition 203 may store a LINUX® operating system.

The first sector of the HDD 200 stores a MBR 201 that includes information that assists the BIOS 105a to load the operating systems stored in the default partition 202 and the non-default partition 203 into the RAM 103, by identifying the addresses of the default partition 202 and the non-default partition 203.

In one example implementation, the MBR 201 occupies one 512-byte sector, and includes a 64-byte partition table 204 that is itself subdivided into four 16-byte segments holding partition-specific information. For each partition, the partition table 204 stores information including a boot flag that indicates whether the partition is a bootable partition, cylinder-head-sector addresses of the first and the last sectors of the partition, the partition type, the logical block address of the first sector in the partition, the number of sectors in the partition, and other partition-specific data.

To load a specific partition into the RAM 103, the MBR 201 uses a boot loading application 207 that can load and execute the VBR of the desired partition, such as the VBR 205 for the default partition 202 or the VBR 206 for the non-default partition 203. The boot loading application 207 may be stored in the first 446 bytes of the MBR 201. When executed, the boot loading application 207 scans the list of the primary partition entries in the partition table 204 to find a bootable partition, then loads and runs a corresponding VBR for a selected partition. The loaded VBR then continues to load the rest of the selected operating system into memory.

The partition table 204 stores one active bootable partition. Remaining partitions are thus stored in the partition table 204 as inactive (or non-bootable) partitions. In FIG. 2, the default partition 202 is the active partition, although the non-default partition 203 could also be the active partition in a different example.

The default partition 202 stores a default operating system that is loaded by the BIOS 105a and includes several files. In particular, the default partition 202 includes the VBR 205 that includes the code that loads and executes the kernel of the default operating system stored at the default partition 202. Additionally, the default partition 202 may include file systems 208 and/or 209, each of which may be, for example, a new technology file system ("NTFS") or a file allocation table ("FAT") file system. The default partition 202 may also store a root directory 210 that includes information about file names, sizes, starting sectors, file properties, and/or starting cluster numbers, and a data storage space 211 that includes the actual data files stored in the default partition 202. The non-default partition 203 may store the data related to the non-default operating system in a similar fashion to the default partition 202. The non-default operating system may be loaded using the information stored in the MBR 201. Alternatively, the non-default partition 203 may include an additional MBR 212, such that the operating system stored in the default partition 203 is loaded using the information stored in the MBR 212.

Figure 3:
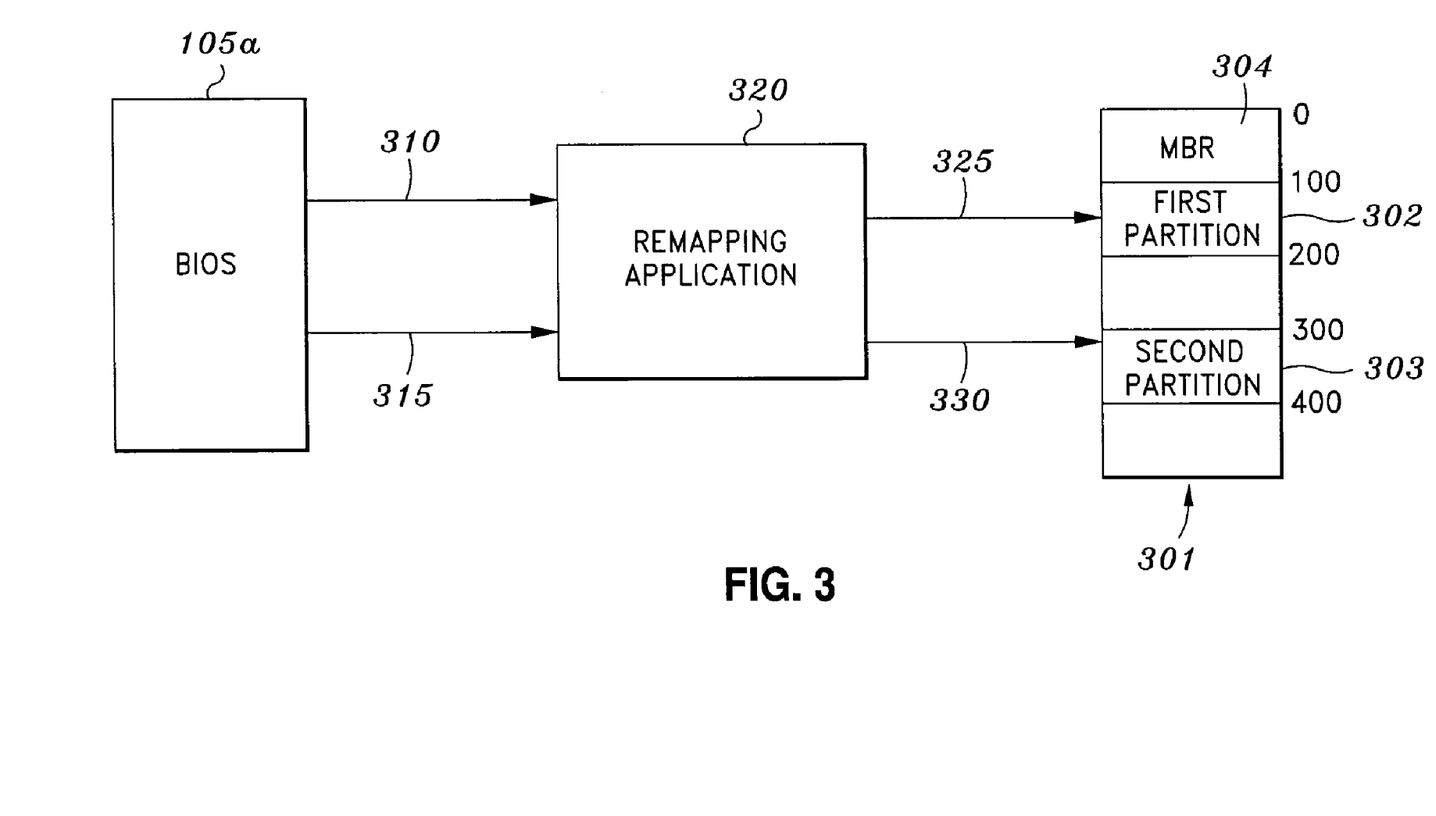
FIG. 3 illustrates the loading of an operating system using an exemplary storage medium.

FIG. 3 illustrates the loading of an operating system by the boot loading program or the BIOS 105a using an exemplary storage medium 301. The storage medium 301 may be the HDD 109, the portable media disk drive 102, or any other storage medium.

The storage medium 301 is partitioned so that it has at least two distinct memory regions storing different operating systems. Specifically, the storage medium 301 includes at least a first partition 302 (between addresses 100 to 199), and a second partition 303 (between addresses of 300 to 399). To determine which operating system to load, the BIOS 105a consults the MBR partition table stored in MBR region 304 on the storage medium 301 (between addresses of 0 to 99). The BIOS 105a loads the operating system which is marked as bootable in the MBR partition table stored in MBR region 304.

To load an operating system, the BIOS 105a accesses data stored on the bootable partition of the storage medium 301. When loading a default operating system from the first partition 302, the BIOS 105a accesses data stored in that region by issuing a first request 310 ("REQ_1"). Similarly, when loading a non-default operating system from the second partition 303, the BIOS 105a accesses data stored in that region by issuing a second request 315 ("REQ_2"). These requests may be requests to read or write data associated with the loading of the operating system stored in the corresponding partition.

As discussed above, the BIOS 105a loads a boot sector from a partition that is identified as bootable in the MBR partition table stored in the MBR region 304. Because one bootable partition is indicated as active at a time, the MBR is changed when the user intends to boot from a non-active partition, placing an additional inconvenience on users and increasing the chances of hardware conflicts.

According to one implementation, multi-booting is accomplished by introducing a remapping application 320 that intercepts requests from the BIOS 105a to access data from the active, default partition, thereby transparently redirecting requests to data stored on a non-active, non-default partition. For example, the remapping application 320 may change the first request 310 and/or the second request 315 to requests that access different locations, such as a revised first request 325 ("REQ_1_new") or a revised second request 330 ("REQ_2_new").

The request change is transparent to the BIOS 105a, such that, when the BIOS 105a issues instructions to load an operating system from an active partition, an operating system actually loads from the non-active partition. In this regard, the MBR 304 for the storage medium 301 is not changed each time an operating system is booted from a non-active, non-default partition. In various implementations, the remapping application 320 may operate in inactive, swapping, or overriding modes, and may be firmware having added instructions for address swapping and address overriding, a modified application of an INT-13x handler in the BIOS 105a, a ROM firmware, a filter driver in the MICROSOFT WINDOWS® operating system, or a command interface program. The remapping application 320 also may be stored in a flash memory.

Figure 4A:
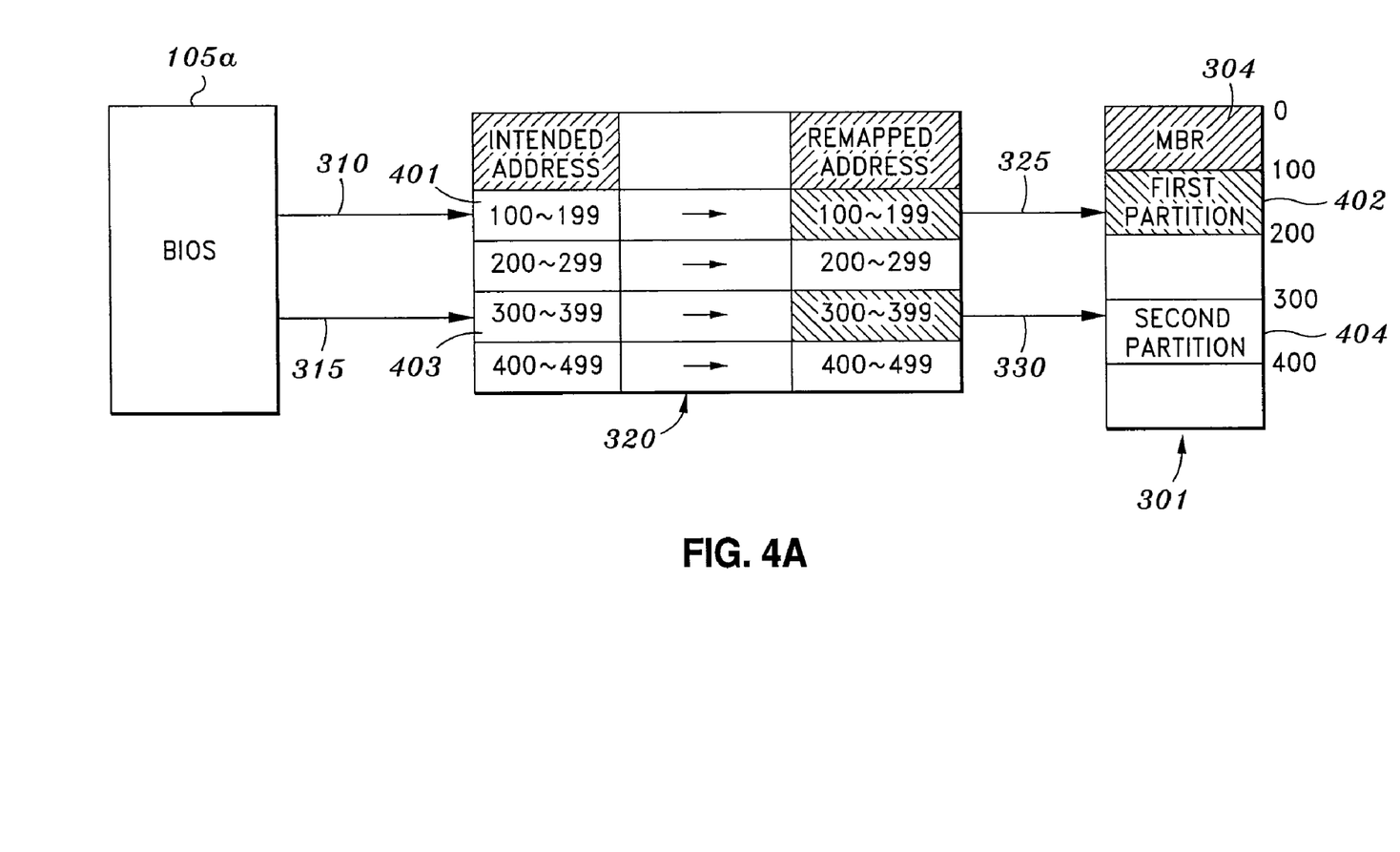
FIGS. 4A to 4C illustrate exemplary operations of a remapping application.

FIG. 4A illustrates the exemplary operation of a remapping application 320 in an inactive mode. Initially, the BIOS 105a issues a first request 310 to access data at an intended address 401 (between addresses of 100 to 199) on the storage medium 301, where the intended address 401 may, for example, correspond to a beginning address of a specific boot sector.

In the inactive mode, the remapping application 320 does not change the intended address 401 from that requested in the first request 310 from the BIOS 105a. As a result, when the BIOS 105a requests access to data at an intended address 401 located in the partition 402, the remapping application 320 directs the revised first request 325 to the same address in the partition 402 requested by first request 310. Similarly, when the BIOS 105a requests to access data at an intended address 403 (between addresses of 300 to 399) located in the partition 404 using second request 315, the remapping application 320 directs the revised second request 330 to the same address in the partition 404 requested by the second request 315.

Figure 4B:
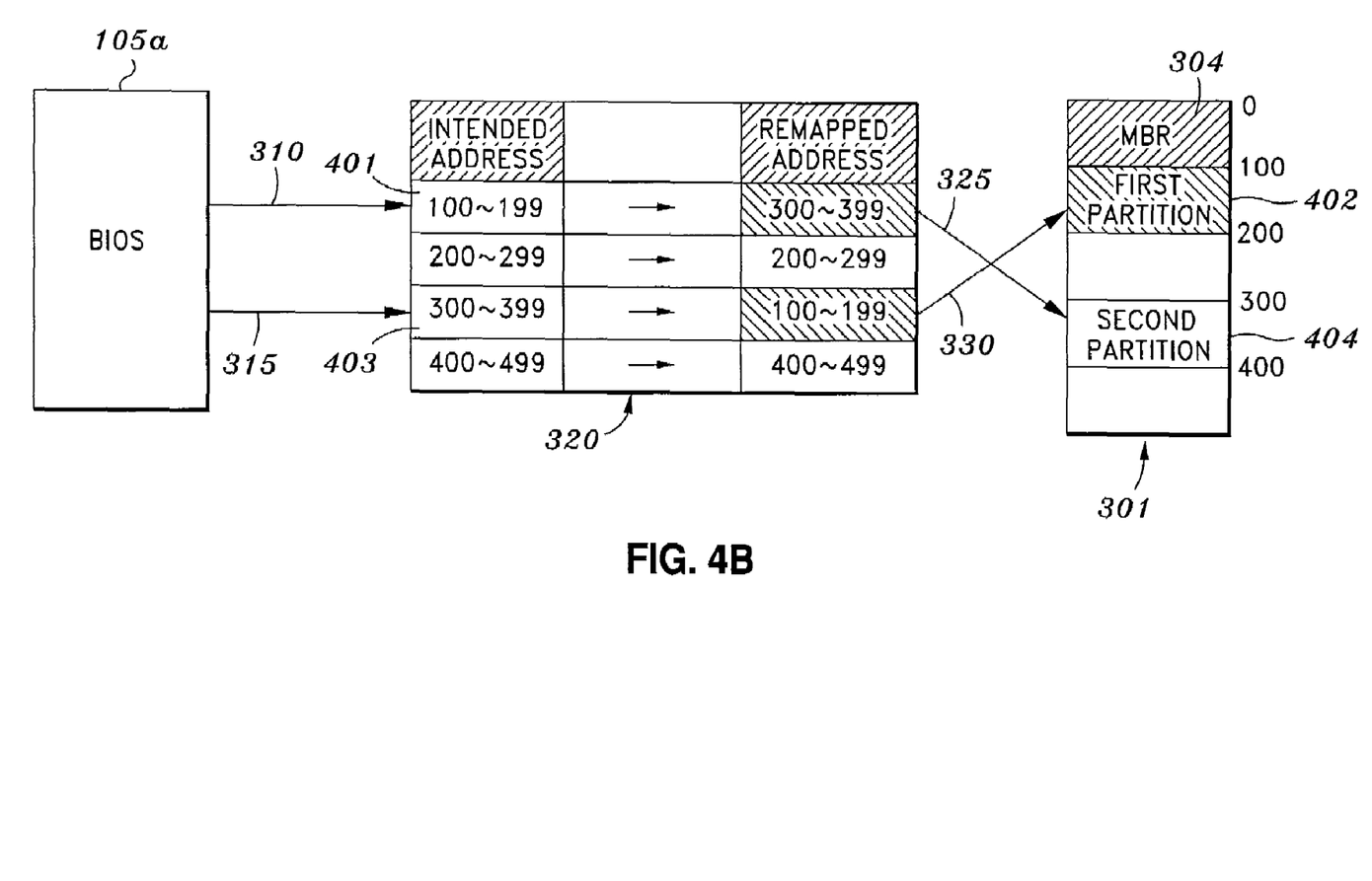

FIG. 4B illustrates the exemplary operation of the remapping application 320 in a swapping mode. In this example, when the BIOS 105a issues a first request 310 to access data at an intended address 401 (between addresses of 100 to 199) on a storage medium 301, the first request is modified by the remapping application 320 to direct the revised first request 325 to the partition 404.

Similarly, when the BIOS 105a issues a second request 315 to access data at an intended address 403 (between addresses of 300 to 399) located in the partition 404, the second request 315 is modified by the remapping application 320 to direct the revised second request 330 to the partition 402. In essence, requests to access the partition 402 and the partition 404 are swapped by the remapping application 320. Therefore, even when the BIOS 105a intends to access data from the partition 402, it is in fact accessing data from the partition 404. Notably, the actual location of data on the storage medium 301 remains unchanged.

Figure 4C:
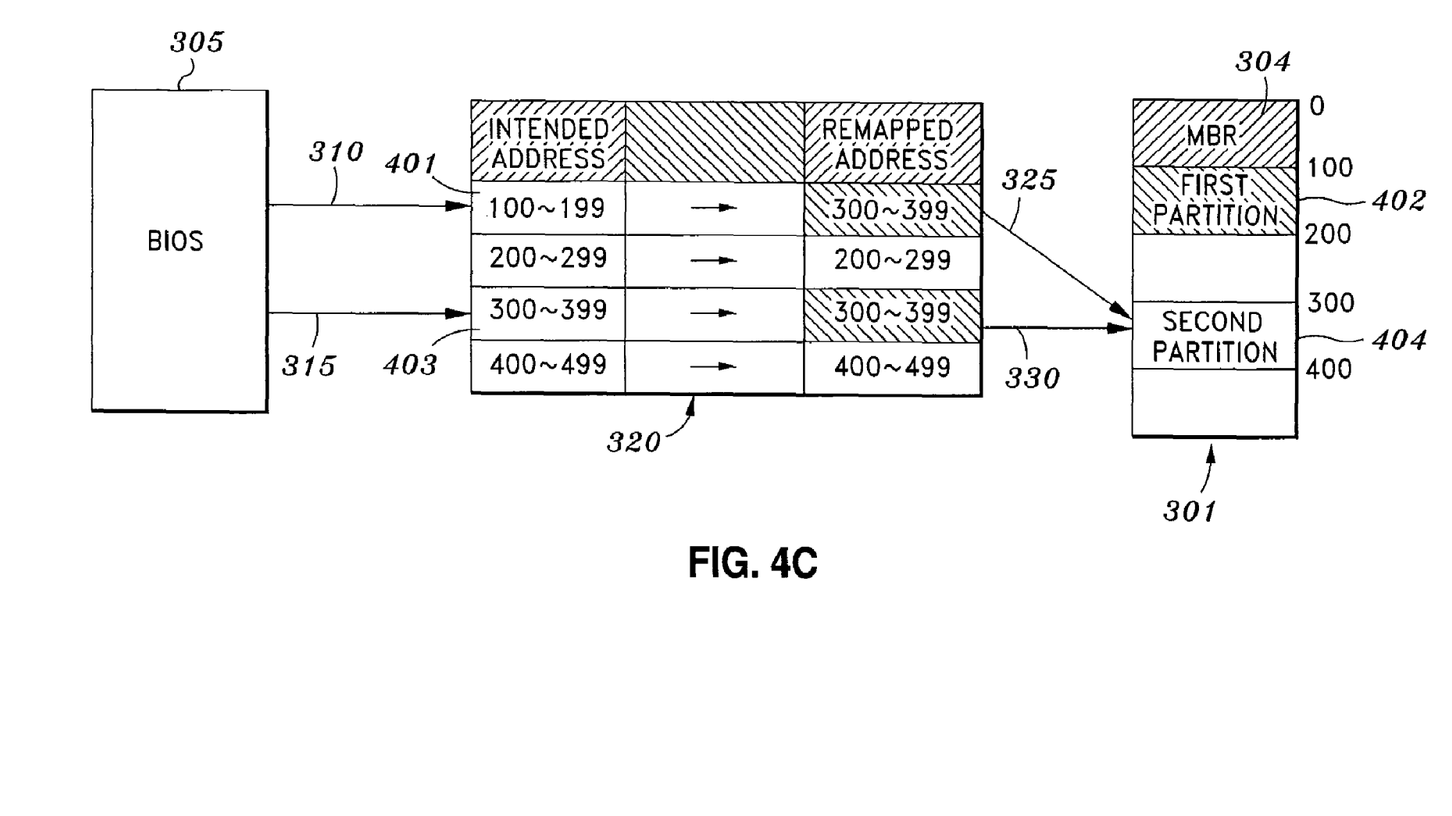

FIG. 4C illustrates the exemplary operation of the remapping application 320 in an overriding mode. In this example, when the BIOS 105a issues a first request 310 to access data at an intended address 401 (between addresses of 100 to 199) on the storage medium 301, the first request 310 is modified by the remapping application 320, which directs the revised first request 325 to the partition 404.

Unlike the swapping mode, however, when the BIOS 105a issues a second request 315 to access data at an intended address 403 (between addresses of 300 to 399) located in the partition 404, the remapping application 320 directs the revised second request 330 to the partition 404. As a result, requests to access the partition 402 are effectively overridden, and requests to access partition 404 are left unchanged. Since requests to access the partition 402 are overridden, partition 402 becomes inaccessible to the BIOS 105a. The actual location of data on the storage medium 301, however, remains unchanged, such that if the remapping application 320 is disabled or if the mode of operation is changed, the BIOS 105a will again be able to access data at the partition 402. Although the examples in FIGS. 3 and 4A to 4C have been described for a configuration with a single MBR associated with the storage medium, other arrangements are possible. For example, partitions 402 and 404 may also store individual MBRs. In such an instance, an operating system stored in the partition 402 is loaded using the information stored in the MBR associated with partition 402, and the operating system stored in the partition 404 is loaded using the information stored in the MBR associated with the partition 404.

Figure 5:
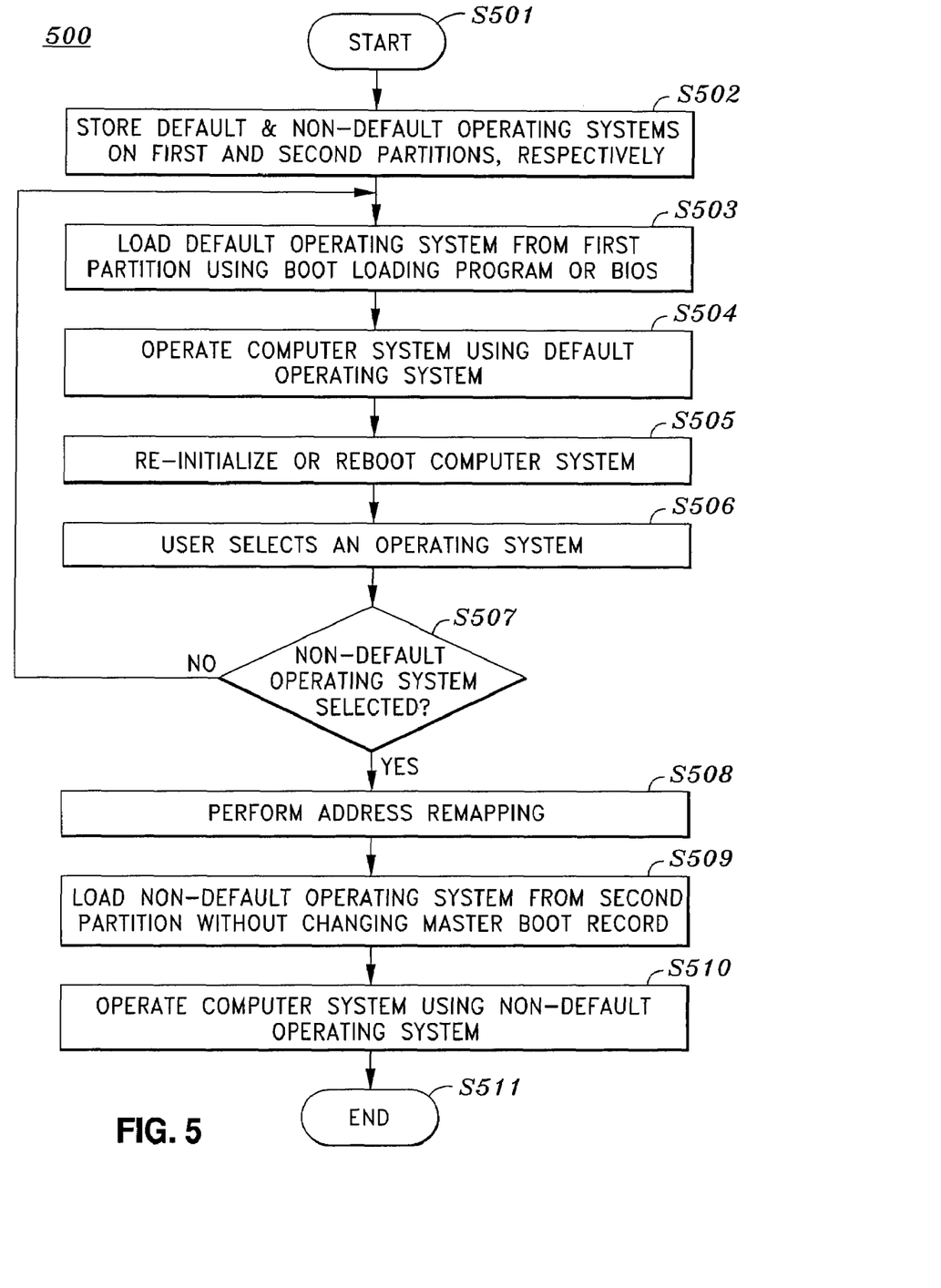
FIGS. 5 and 6 are flowcharts illustrating exemplary processes for performing address remapping.

FIG. 5 is a flowchart illustrating an example process 500 for performing address remapping. When the process 500 begins (S501), default and non-default operating systems ("OS1" and "OS2") are respectively stored on first and second partitions ("Partition_A" and "Partition_B") of a storage medium (S502). In this example, the first partition is the active, bootable partition, and the boot loading application or BIOS loads the default operating system from the first partition (S503). Once booted, the user may operate the computer system using the default operating system (S504).

When the computer system is again re-initialized or rebooted (S505), the user inputs a command to select an operating system (S506). If the non-default operating system is selected (S507), address remapping is performed by the remapping application 320 using address swapping or address overriding (S508). If the default operating system is selected (S507), the default operating system is again loaded (S503).

Address remapping may be performed through address swapping or address overriding, as described above with respect to FIGS. 4B and 4C. With address remapping, the boot loading program or the BIOS reads the starting address of the boot sector of the second partition, and loads the non-default operating system from the second partition, although the MBR itself remains unchanged (S509). Once loaded, the user may operate the computer system using the non-default operating system (S510), at which point the process 500 ends (S511).

Figure 6:
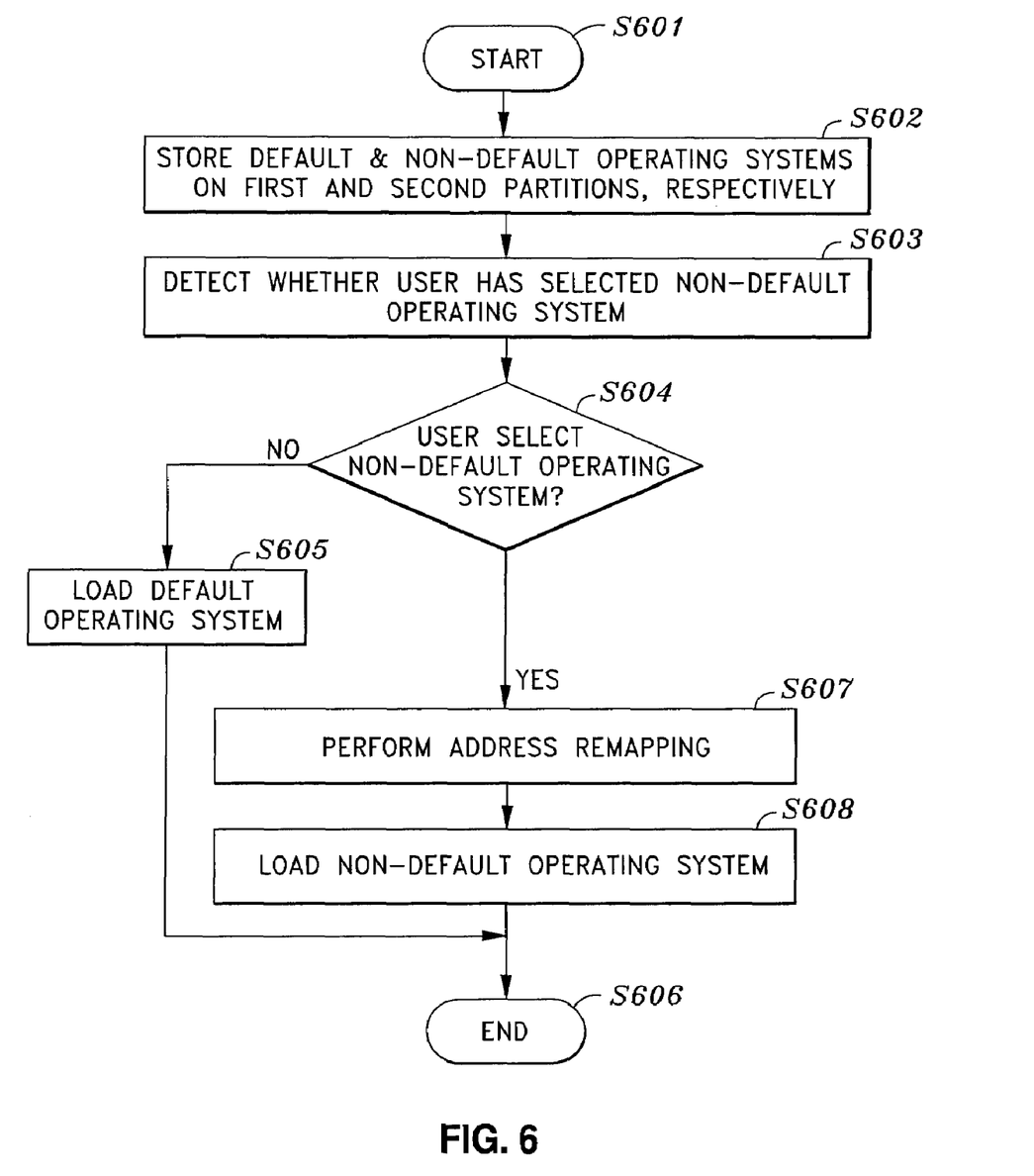

FIG. 6 is a flowchart illustrating another example process 600 for performing address remapping. When the process 600 begins (S601), default and non-default operating systems are stored on first and second partitions of a storage medium (S602). During booting or initialization, for example, the computer system detects whether a user selected the non-default operating system (S603). If the user has not selected the non-default operating system (S604), the default operating system is loaded (S605), and the process 600 ends (S606).

If the user has selected the non-default operating system (S604), address remapping is performed by the remapping application 320 (S607). Address remapping may be performed through address swapping or address overriding, as described above with respect to FIGS. 4B and 4C. The boot loading program or BIOS reads the starting address of the second partition, and loads the non-default operating system (S608), and the process 600 ends (S606). If no user command is received (S604), the boot loading program or BIOS loads the default operating system from the active partition, as specified in the MBR (S605).

Figure 7:
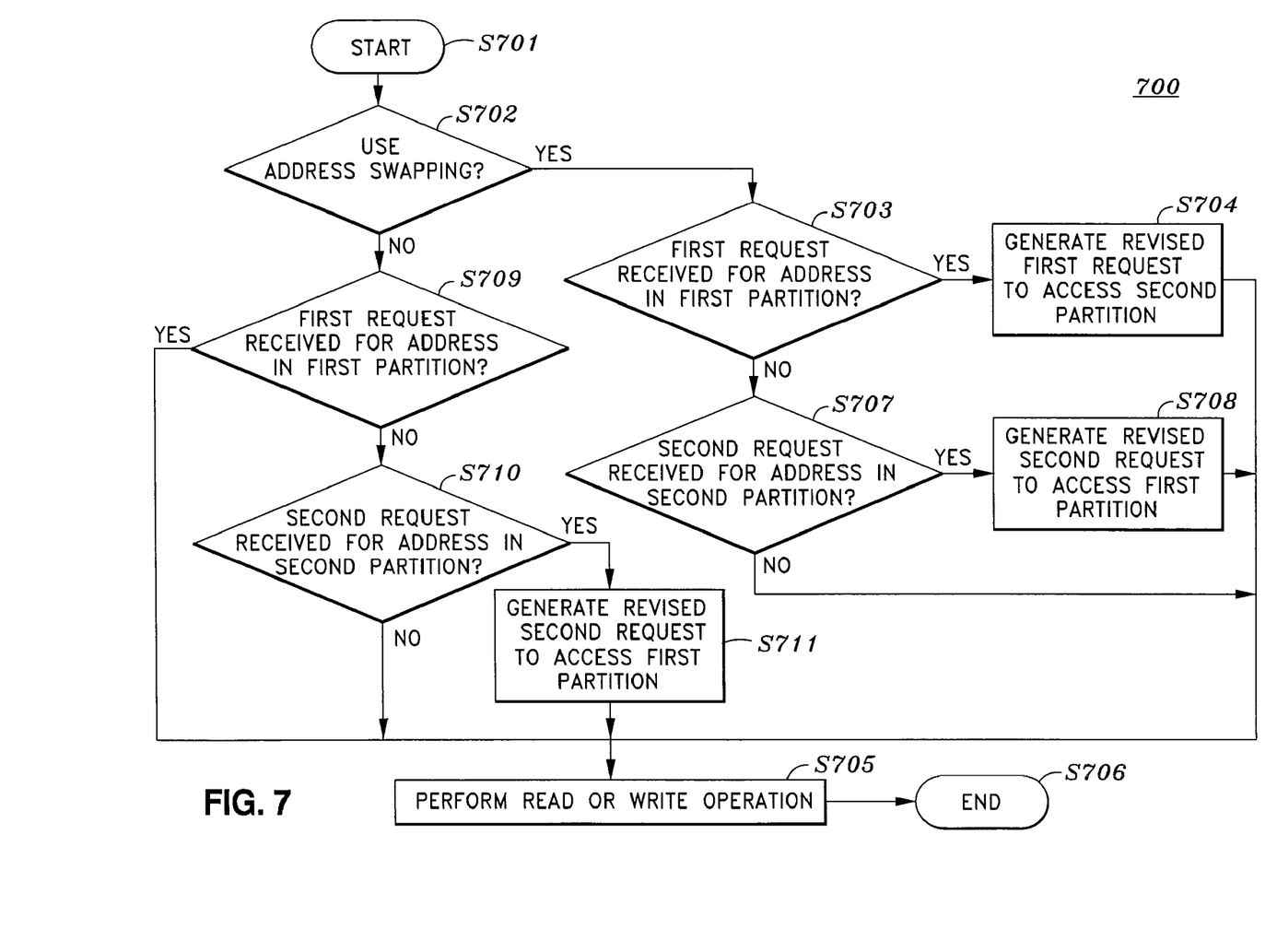
FIG. 7 is a flowchart illustrating an example process for performing address calculation.

FIG. 7 is a flowchart illustrating an example process 700 for performing address calculation. Address remapping may be performed through address swapping or address overriding, as described with respect to FIGS. 4B and 4C. In this example, the default and non-default operating systems are respectively stored in the first and second partitions of a storage medium. When the process 700 begins (S701), it is determined whether address remapping is to occur utilizing address swapping or address overriding for address remapping (S702).

If address swapping is to be utilized (S702) and the remapping application 320 receives a first request for an address in the first partition (S703), the remapping application modifies the first request and generates a revised first request to access an address in the second partition (S704). A read or write operation is performed according to the revised request (S705), and the process 700 ends (S706).

In one example implementation, the remapping application 320 calculates a remapped address (S704) using Equation (1):

$$\text{REMAPPED\_ADDRESS} = \text{REQUESTED\_ADDRESS} - \text{ADD\_A} + \text{ADD\_B} \quad (1)$$

In Equation (1), ADD_A represents a starting address of the first partition, ADD_B represents a starting address the second partition, REQUESTED_ADDRESS represents the address requested by the first request, and REMAPPED_ADDRESS represents the modified address of the revised first request.

If address swapping is to be utilized (S702) and the remapping application does not receive a first request (S703) but rather receives a second request for an address in the second partition (S707), the remapping application 320 modifies the second request and generates a revised second request to access an address in the first partition (S708). A read or write operation is performed according to the revised request (S705), and the process 700 ends (S,706).

In one example implementation, the remapping application 320 calculates a remapped address (S708) using Equation (2):

$$\text{REMAPPED\_ADDRESS} = \text{REQUESTED\_ADDRESS} + \text{ADD\_A} - \text{ADD\_B} \quad (2)$$

In Equation (2), ADD_A represents a starting address of the first partition, ADD_B represents a starting address the second partition, REQUESTED_ADDRESS represents the address requested by the second request, and REMAPPED_ADDRESS represents the modified address of the revised second request.

If address swapping is to be utilized (S702), and the remapping application does not receive a first request (S703) or a second request (S707), the read or write operation is performed according to the request (S705), and the process 700 ends (S706). One specific example of this particular operation would occur of the boot loading program or BIOS issued a third request to access a third partition.

If address swapping is not utilized (S702), address overriding is performed. In this example, requests to access the second partition are overridden to access the first partition. Thus, if the boot loading program or BIOS issues a first request to access the first partition (S709), the read or write operation is performed based upon the first request (S705) and the process 700 ends (S706).

If the boot loading program or BIOS issues a second request to access the second partition (S710), the remapping application modifies the second request to calculate a revised second request to access the first partition (S711), such as by using Equation (2), above. A read or write operation is performed according to the revised second request (S705), thereby ending the process 700 (S706).

If address overriding is to be utilized (S702), and the remapping application does not receive a first request (S709) or a second request (S710), the read or write operation is performed according to the request (S705), and the process 700 ends (S706). One specific example of this particular operation would occur of the boot loading program or BIOS issued a third request to access a third partition.

In another example, requests to access the first partition are overridden to access the second partition, such as by using Equation (1), above.

Figure 8:
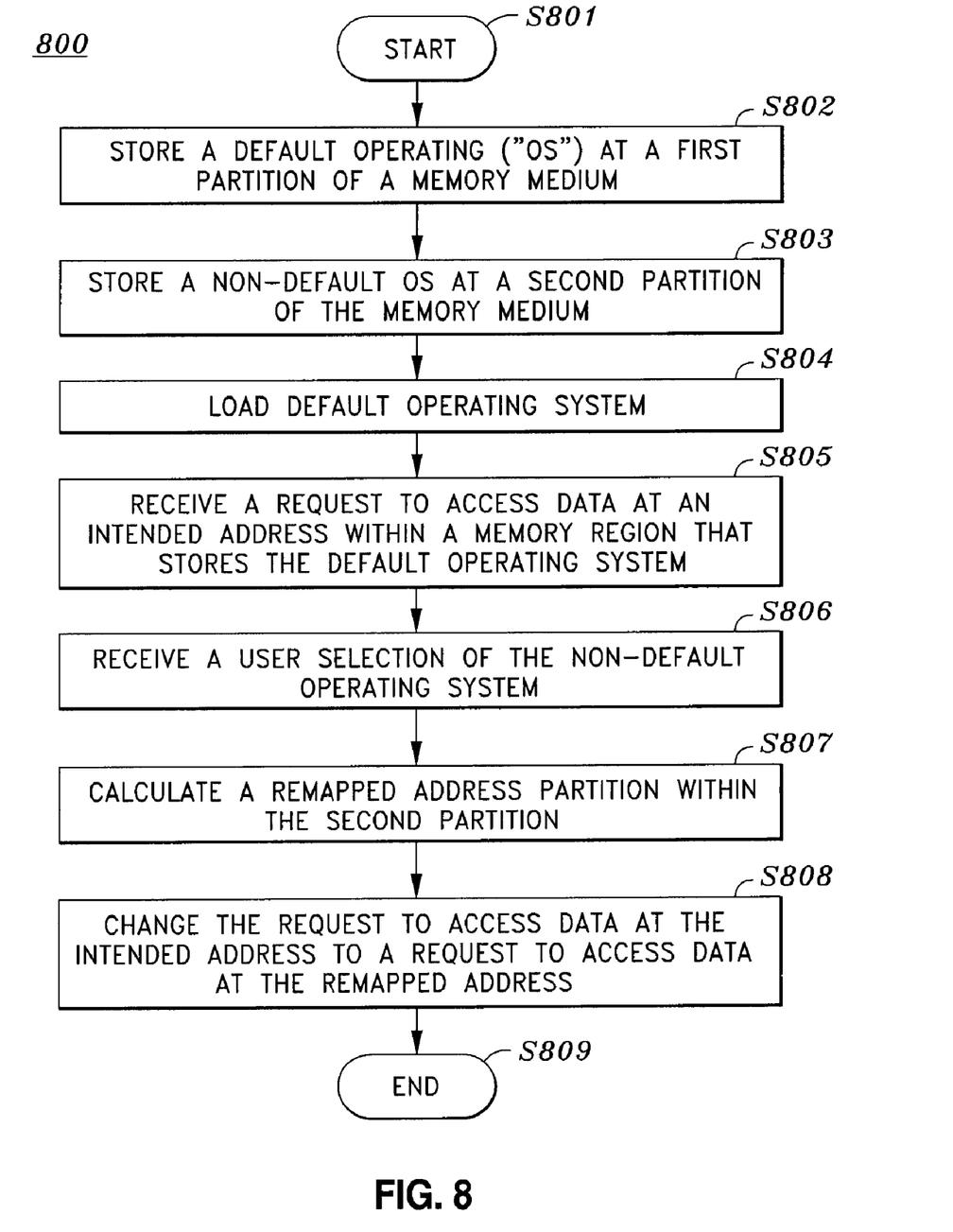
FIG. 8 is a flowchart illustrating an exemplary process for performing address remapping.

FIG. 8 is a flowchart illustrating an exemplary process 800 for performing address remapping in a multi-booting system. When the process 800 begins (S801), a default operating system is stored at a first partition of a memory medium (S802), and a non-default operating system is stored at a second partition (S803). A boot loading application or BIOS loads the default operating system, according to the master boot record (S804).

A request is received to access data at an intended address within a partition that stores the default OS (S805), and a selection of the non-default operating system is received (S806). A remapped address that is within the second partition is calculated (S807). For example, calculating the remapped address may include calculating the remapped address based on the intended address and an offset between a starting address of the first address region and a starting address of the second address region.

Finally, the remapping application changes the request to access data at the intended address to a request to access data at the remapped address (S808), and the process 800 ends (S809). The data then may be accessed at a remapped address. In one example, changing the request to access data at the intended address may further include address overriding, such that a request to access data at the remapped address is unchanged. In another example, changing the request to access data at the intended address further may include address swapping, such that a request to access data at the remapped address is changed to a request to access data at the intended address. Furthermore, the remapping application may be a filter driver.

The method of FIG. 8 may further include loading the non-default operating system for booting, or storing a third OS at a third address region of the memory medium. Address remapping may be performed when a predetermined command is input, such as during booting. The predetermined command may include a function key input and/or a selection command in the boot loading application's setup menu.

Tables 1 to 6, below, include exemplarily computer code for performing volatile or non-volatile address remapping. When volatile address remapping is utilized, the remapping lasts while the computer system is on and is reset when the computer is rebooted or re-initialized. On the other hand, if non-volatile address remapping is utilized, the remapping lasts even after the computer system is rebooted or re-initialized.

When performing address remapping, especially non-volatile address remapping, an interface with BIOS may be created. Various methods exist for calling or interfacing with BIOS, such as by using an unused software interrupt (e.g., INT15), or registering and utilizing the system management interrupts ("SMI") trap service. Address remapping may be performed during a power-on self-test ("POST") process or a BIOS booting process, as illustrated in Table 6. Additionally, option ROM ("OpROM"), or a filter driver may be programed to perform address remapping.

In an additional implementation, two or more operating systems may be stored in the same partition, where the remapping application 320 is used to enable multi-booting from the same partition. In such an instance, the remapping application 320 redirects requests from a boot loading application to a memory region that is located on the same partition as the currently "active" operating system. However, when redirected by the remapping application 320, the BIOS 105a will load an operating system from the address specified by the remapping application 320. This arrangement may be particularly useful for situations when a user wishes to store a backup of the operating system files on the same partition with the currently active (e.g. booting) operating system. In case the files of the currently active operating system become corrupted, the user may utilize the remapping application 320 to force the BIOS 105*a* to load the backed-up version of the operating system by performing an address override.

During the booting process, when the operating system files stored in the first memory region become corrupted, the remapping application 320 may override the address of the corrupted files with an address of the backed up files located in the second memory region. Consequently, the BIOS 105*a* may load a backed up operating system from the same partition, although the backed-up operating system is stored at a different partition from the active operating system. Backed-up operating system files may also be stored on a different partition as well.

In addition, address remapping may be triggered in a variety of ways. For example, a function key may be utilized to enable address remapping by performing a BIOS POST operation. Moreover, it may be possible to select address remapping, as well as specific type of address remapping (i.e., address swapping or address overriding) from BIOS setup menu.

The arrangements have been described with particular illustrative implementations. It is to be understood that the concepts are not however limited to the above-described implementations and that various changes and modifications may be made.

TABLE 1

```
enum {
    COND_NORMAL = 0;
    COND_SWAP;
    COND_SWAP_NV;    // NV - Non-Volatile
    COND_OVERRIDE;
    COND_OVERRIDE_NV;
}
enum {
    CONST_NON_VOLATILE = 0;
    CONST_VOLATILE;
}
typedef struct _DISK_PARAM {
    BYTE function;
    BYTE drive;
    WORD cylinder;
    WORD head;
    WORD sector;
    WORD size;
    PCHAR buffer;
    QWORD AddressLBA;
//  ====================================
                             //
    BYTE condition;          // NORMAL, SWAP, SWAP_NV, OVERRIDE, OVERRIDE_NV
                             //
    QWORD BaseAddressRegionA;
    QWORD BaseAddressRegionB;
    QWORD RegionLength;
//  ====================================
} DISK_PARAM;
```

TABLE 2

```
typedef struct _SWAP_PARAM
{
                             //
    BYTE condition;   // NORMAL, SWAP, SWAP_NV, OVERRIDE, OVERRIDE_NV
                             //
    QWORD BaseAddressRegionA;
    QWORD BaseAddressRegionB;
    QWORD RegionLength;
} SWAP_PARAM;
QWORD hddConvertCHSToLBA(DISK_PARAM * pParam)
{
    // When
    // H0 : max head + 1
    // S0 : max sector
    // H0 and S0 is initialized during Power On Self Test (P.O.S.T)
    //
    DISK_PARAM * p = pParam;
    pParam->AddressLBA = (p->cylinder*H0 + p->head)*S0 + p->Sector – 1;
    return pParam->AddressLBA;
}
void int13(DISK_PARAM * pParam)
{
    switch(pParam->function)
    {
        case INT13_READ_DISK_SECTOR:                     // 0x02
        case INT13_WRITE_DISK_SECTOR:                    // 0x03
        case INT13_VERIFY_DISK_SECTORS:                  // 0x04
        case INT13_FORMAT_DISK_TRACK:                    // 0x05
        case INT13_FORMAT_TRACK_AND_MARK_LEAD_SECTOR:    // 0x06
```

TABLE 3

```
        case INT13_FORMAT_ENTIRE_DISK_CYLINDER:   // 0x07
        case INT13_RETURN_DISK_PARAMETERS:        // 0x08
            pParam->AddressLBA = hddConvertCHSToLBA(pParam);
            break;
        case INT13_CHECK_EXTENSION_PRESENT:       // 0x41
        case INT13_EXTENDED_READ:     // 0x42
        case INT13_EXTENDED_WRITE:    // 0x43
        case INT13_EXTENDED_VERIFY_SECTOR:        // 0x44
        default:
            break;
    }
    if(condition)
    {
        switch(condition)
        {
            case COND_SWAP :
            case COND_SWAP_NV :
                if( pParam->AddressLBA >= pParam->BaseAddressRegionA
                    && pParam->AddressLBA <= (pParam->BaseAddressRegionA + RegionLength))
                {
                    // We are in region A, convert to region B
                    //
                    QWORD Offset = pParam->AddressLBA - pParam->BaseAddressRegionA;
                    pParam->AddressLBA = pParam->BaseAddressRegionB + Offset;
                }
                else if( pParam->AddressLBA >= pParam->BaseAddressRegionA
                    && pParam->AddressLBA <= (pParam-
```

TABLE 4

```
>BaseAddressRegionA + RegionLength))
                {
                    // We are in region B, convert to region A
                    //
                    QWORD Offset = pParam->AddressLBA - pParam->BaseAddressRegionB;
                    pParam->AddressLBA = pParam->BaseAddressRegionA + Offset;
                }
                break;
            case COND_OVERRIDE:
            case COND_OVERRIDE_NV:
                //
                // Override means Region A is overrided by Region B
                //
                if( pParam->AddressLBA >= pParam->BaseAddressRegionA
```

TABLE 4-continued

```
                    && pParam->AddressLBA <= (pParam->BaseAddressRegionA + RegionLength))
                {
                    // We are in region A, convert to region B
                    //
                    QWORD Offset = pParam->AddressLBA - pParam->BaseAddressRegionA;
                    pParam->AddressLBA = pParam->BaseAddressRegionB + Offset;
                }
                break;
            default:
                break;
        }
    }
    oldInt13(pParam);
}
```

TABLE 5

```
/*   Nvxxxx is a non-volatile storage, this can be maintained across reboot or shutdown.
        NvEngagement
        NvCondition
        NvBaseAddressRegionA
        NvBaseAddressRegionB
        NvRegionLength
*/
void SwapCommand(SWAP_PARAM * pSParam)
{
    switch(pSParam->condition)
    {
        case COND_SWAP:
            NvEngagement = 1;
            break;
        case COND_SWAP_NV:
            cmosIsVolatile = 2;
            break;
        case COND_OVERRIDE:
            cmosEngagement = 1;
            break;
        case COND_OVERRIDE_NV:
            cmosIsVolatile = 2;
            break;
    }
    NvCondition = pSParam->condition;
    NvBaseAddressRegionA = pSParam->BaseAddressRegionA;
    NvBaseAddressRegionB = pSParam->BaseAddressRegionB;
    NvRegionLength = pSParam->RegionLength;
}
```

TABLE 6

```
BIOS_POST( )
{
    DISK_PARAM DiskParam;
    ..
    ...
    HarewareInit( );
    FdiskInit(&DiskParam);        // Hard Disk Init
                                   // INITIALIZE DISK SECTOR AND NUMBER OF HEAD
    ..
    ...
    if(NvCondition && NvEngagement)   // SWAP or OVERRIDE
    {
                                   // WHEN NvENGAGEMENT IS ONE JUST AT THE
LAST TIME, SWAP AND OVERRIDE ARE NOT PERFORMED IN NEXT POST, BUT WHEN
NvENGAGEMENT IS MORE THAN TWO, SWAP AND OVERRIDE ARE MAINTAINED SINCE VALUE IS
MAINTAINED UNTIL NEXT SWAP AND OVERRIDE COMMAND IS INPUTTED
        NvEngagement--;
        if(NvEngagement) NvEngagement++;
                                   //
```

TABLE 6-continued

```
// DISK_PARAM FOR SWAP AND OVERRIDE IS
INITIALIZED, AND WHEN INIT13 CALL OCCURS, SWAP AND OVERRIDE ARE PERFORMED USING
INITIALIZED BASEADDRESS AND LENGTH
        //
    DiskParam.condition = NvCondition;
    DiskParam.BaseAddressRegionA = NvBaseAddressRegionA;
    DiskParam.BaseAddressRegionB = NvBaseAddressRegionB;
    DiskParam.RegionLength = NvRegionLength;
}
else
{
    NvCondition = COND_NORMAL;
    NvEngagement = 0;
}
INT19( ); // BOOT TO OS... }
```

What is claimed is:

1. A method of performing address remapping in a multi-booting system, the method comprising:
storing a default operating system ("OS") and a non-default OS at first and second address regions of a memory medium of a multi-booting system, respectively;
receiving a selection indicative of the non-default OS;
receiving, by a remapping application and from a basic input/output system ("BIOS") of the multi-booting system, a request to access data at an intended address within the first address region associated with the default OS;
calculating, by the remapping application, a remapped address within the second address region associated with the non-default OS based upon the selection; and
changing, by the remapping application, the request to access data at the intended address within the first address region associated with the default OS to a request to access data at the remapped address within the second address region associated with the non-default OS.

2. The method of claim 1, further comprising:
receiving, by the remapping application and from the BIOS, a request to access data at the remapped address within the second region associated with the non-default OS;
calculating, by the remapping application, a second remapped address within the first address region associated with the default OS;
changing, by the remapping application, the request to access data at the remapped address within the second region associated with the non-default OS to a request to access data at the intended address within the first region associated with the default OS; and
obtaining the data at the intended address.

3. The method of claim 1, further comprising:
receiving, by the remapping application and from the BIOS, a request to access data at the remapped address;
directing, by the remapping application, the request to access the data at the remapped address, to the remapped address; and
obtaining the data at the remapped address.

4. The method of claim 1, wherein, responsive to receiving the request to access the data at the intended address from the BIOS, the remapping application calculates the remapped address based on the intended address and an offset between a staffing address of the first address region and a staffing address of the second address region.

5. The method of claim 1, wherein the remapping application is a filter driver.

6. The method of claim 1, further comprising booting the non-default OS based upon the selection.

7. The method of claim 1 further comprising storing an alternate OS at a third address region of the memory medium.

8. The method of claim 1, wherein the selection is received during a booting process.

9. The method of claim 1, wherein the selection comprises a control or menu selection or a keypad depression.

10. The method of claim 1, further comprising booting the default OS and the non-default OS using a single BIOS.

11. The method of claim 1, wherein the selection is a user selection.

12. The method of claim 1, wherein the selection is an automatic selection.

13. The method of claim 1, further comprising booting the non-default OS using a default master boot record ("MBR") associated with the default OS.

14. The method of claim 13, wherein the second address region does not store a non-default MBR associated with the non-default OS.

15. The method of claim 13, wherein:
the intended address further comprises an address associated with a volume boot record ("VBR") of the default OS, in a partition entry associated with the default OS, and
when the non-default OS is booted, the partition entry identifies the default OS as the only bootable OS.

16. The method of claim 13, wherein the non-default OS is booted without changing the default MBR to identify the non-default OS as bootable.

17. The method of claim 1, wherein the BIOS comprises an operating system-independent BIOS.

18. The method of claim 1, wherein:
the remapping application operates in an inactive mode, a swapping mode, and an overriding mode,
in the inactive mode, requests to access data at intended addresses within the first address region and the second address region are directed to the intended addresses in the first address region and the second address region, respectively,
in the swapping mode, requests to access data at intended addresses within the first address region and the second address region are directed to remapped addresses in the second address region and the first address region, respectively, and
in the overriding mode, requests to access data at intended addresses within the first address region and the second address region are directed to a remapped address in the second address region and the intended address in the second address region, respectively.

19. A multi-booting system for performing address remapping, the system comprising:
   one or more computers; and
   a computer-readable medium coupled to the one or more computers having instructions stored thereon which, when executed by the one or more computers, cause the one or more computers to perform operations comprising:
      storing a default operating system ("OS") and a non-default OS at first and second address regions of the computer-readable medium, respectively,
      receiving a selection indicative of the non-default OS,
      receiving, by a remapping application and from a basic input/output system ("BIOS") of the multi-booting system, a request to access data at an intended address within the first address region associated with the default OS,
      calculating, by the remapping application, a remapped address within the second address region associated with the non-default OS based upon the selection, and
      changing, by the remapping application, the request to access data at the intended address within the first address region associated with the default OS to a request to access data at the remapped address within the second address region associated with the non-default OS.

20. A computer storage medium encoded with a computer program for performing address remapping in a multi-booting system, the program comprising instructions that when executed by data processing apparatus cause the data processing apparatus to perform operations comprising:
   storing a default operating system ("OS") and a non-default OS at first and second address regions the computer storage medium, respectively,
   receiving a selection indicative of the non-default OS,
   receiving, by a remapping application and from a basic input/output system ("BIOS") of the multi-booting system, a request to access data at an intended address within the first address region associated with the default OS,
   calculating, by the remapping application, a remapped address within the second address region associated with the non-default OS based upon the selection, and
   changing, by the remapping application, the request to access data at the intended address within the first address region associated with the default OS to a request to access data at the remapped address within the second address region associated with the non-default OS.

* * * * *